United States Patent
Vladimirov et al.

(10) Patent No.: US 12,035,208 B2
(45) Date of Patent: Jul. 9, 2024

(54) SYSTEM AND METHOD FOR ACTIVE DATA COLLECTION MODE CONTROL FOR REDUCING CROWD-SOURCING SIGNAL DATA COLLECTION REQUIRED FOR FINGERPRINT DATABASE MAINTENANCE

(71) Applicant: Electronics and Telecommunications Research Institute, Daejeon (KR)

(72) Inventors: Blagovest Iordanov Vladimirov, Daejeon (KR); Sang Joon Park, Daejeon (KR); Jin Hee Son, Daejeon (KR); So Yeon Lee, Daejeon (KR); Chang Eun Lee, Daejeon (KR); Sung Woo Jun, Daejeon (KR); Eun Young Cho, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 235 days.

(21) Appl. No.: 17/486,018

(22) Filed: Sep. 27, 2021

(65) Prior Publication Data
US 2022/0103984 A1    Mar. 31, 2022

(30) Foreign Application Priority Data
Sep. 28, 2020    (KR) .................. 10-2020-0126291

(51) Int. Cl.
*H04W 4/33*    (2018.01)
*G06N 7/01*    (2023.01)
*H04B 17/318*    (2015.01)
*H04W 4/02*    (2018.01)
*H04W 24/08*    (2009.01)

(52) U.S. Cl.
CPC ............ *H04W 4/33* (2018.02); *G06N 7/01* (2023.01); *H04B 17/318* (2015.01); *H04W 4/023* (2013.01); *H04W 24/08* (2013.01)

(58) Field of Classification Search
None
See application file for complete search history.

(56) References Cited

U.S. PATENT DOCUMENTS

| | | | |
|---|---|---|---|
| 9,304,970 B2 * | 4/2016 | Wirola | .................. G06F 17/00 |
| 2010/0106745 A1 | 4/2010 | Cho et al. | |
| 2017/0132248 A1 | 5/2017 | Kim et al. | |

FOREIGN PATENT DOCUMENTS

| | | |
|---|---|---|
| EP | 2 556 706 B1 | 12/2014 |
| KR | 10-1580863 B1 | 12/2015 |

OTHER PUBLICATIONS

Fatemi, Mehdi, et al., "Cognitive Control: Theory and Application." *IEEE Access* 2, 2014 (pp. 698-710).

* cited by examiner

*Primary Examiner* — Adolf Dsouza
(74) *Attorney, Agent, or Firm* — NSIP Law

(57) ABSTRACT

An active data collection mode control system to reduce crowd sourcing signal data collection required for fingerprint database (FPDB) maintenance is provided. The system includes a mobile device that supports a survey mode, a localization mode, and a crowd-sourcing mode, and a server that receives data from the mobile device, generates and updates an FPDB, and controls a data collection mode.

17 Claims, 4 Drawing Sheets

SYSTEM AND METHOD FOR ACTIVE DATA COLLECTION MODE CONTROL FOR REDUCING CROWD-SOURCING SIGNAL DATA COLLECTION REQUIRED FOR FINGERPRINT DATABASE MAINTENANCE

CROSS-REFERENCE TO RELATED APPLICATION

This application claims priority to and the benefit of Korean Patent Application No. 10-2020-0126291, filed on Sep. 28, 2020, the disclosure of which is incorporated herein by reference in its entirety.

BACKGROUND

1. Field

The present invention relates to a system and method for active data collection mode control for reducing crowd-sourcing signal data collection required for fingerprint database (FPDB) maintenance

2. Discussion of Related Art

Indoor navigation systems according to the related art provide localization services using radio frequency (RF) (Wi-Fi or Bluetooth low energy (BLE)) signal fingerprints.

Due to changes at a target site, a discrepancy occurs between a fingerprint database (FPDB) and an actual distribution of RF signals at the site, and the quality of the localization service is degraded.

SUMMARY OF THE INVENTION

The present invention is directed to solving by a system and method that are capable of, with regard to updating a fingerprint database (FPDB) using an indoor navigation using an FPDB and crowd-sourcing data, reducing the amount of Wi-Fi/Bluetooth low energy (BLE) signal data collected through crowd-sourcing to keep the latest FPDB for a target site.

The technical objectives of the present invention are not limited to the above, and other objectives may become apparent to those of ordinary skill in the art based on the following description.

According to an aspect of the present invention, there is provided a system for active data collection mode control for reducing crowd-sourcing signal data collection required for fingerprint database (FPDB) maintenance, the system including: a mobile device configured to support a survey mode, a localization mode, and a crowd-sourcing mode; and a server configured to receive data from the mobile device, generate and update an FPDB, and control a data collection mode.

According to an aspect of the present invention, there is provided a method of active data collection mode control for reducing crowd-sourcing signal data collection required for FPDB maintenance, the method including the steps of: (a) collecting data from a mobile device to generate an FPDB; and (b) monitoring a performance change of an indoor localization system to control a data collection mode.

According to an aspect of the present invention, there is provided a server for performing active data collection mode control for reducing crowd-sourcing signal data collection required for FPDB maintenance, the server including: an inputter configured to collect data from a mobile device; a memory in which a program for generating and updating an FPDB using the data is stored; and a processor configured to execute the program, wherein the processor monitors a performance change of an indoor localization system to control a data collection mode.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION OF EXEMPLARY EMBODIMENTS

Figure 1:
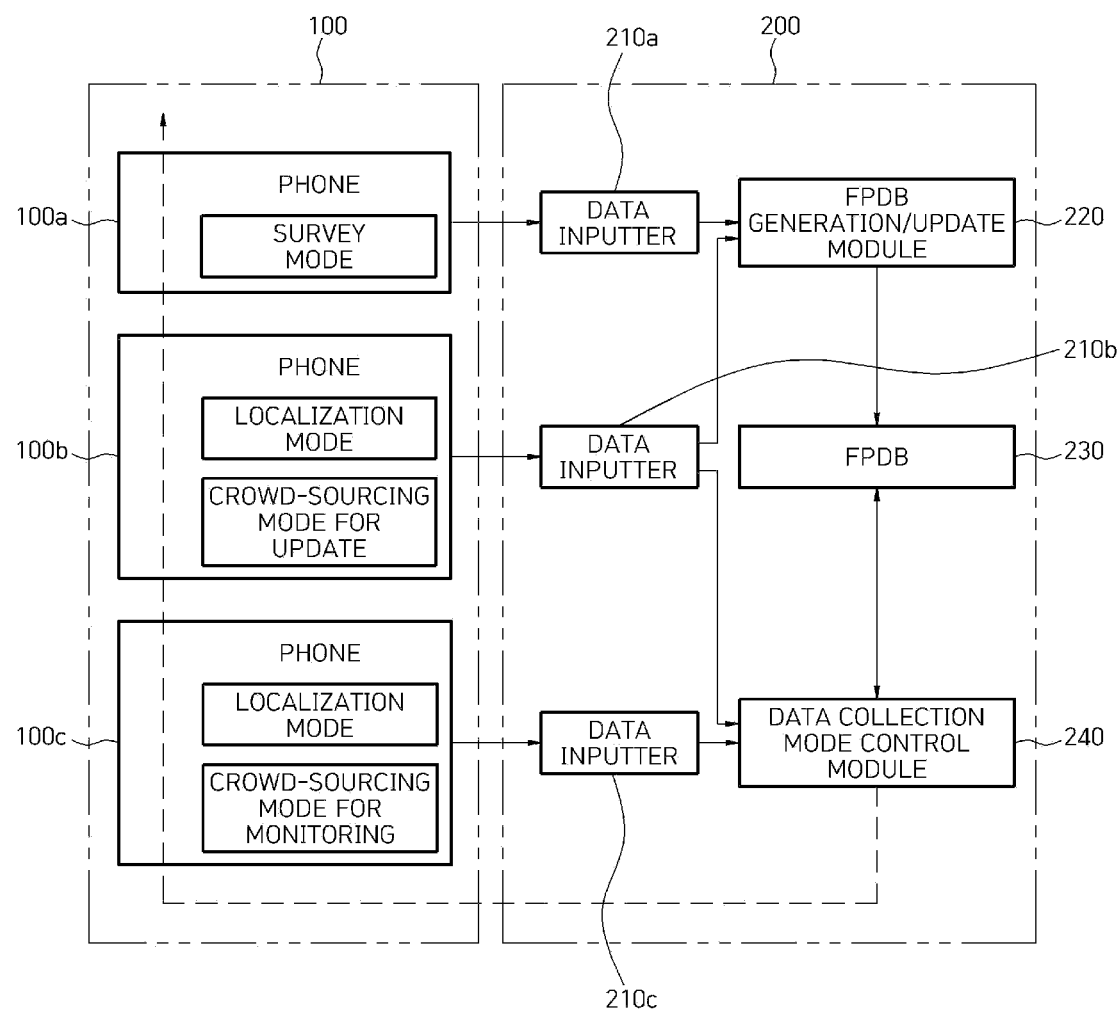
FIG. 1 illustrates a system for active data collection mode control for reducing crowd-sourcing signal data collection required for fingerprint database (FPDB) maintenance according to an embodiment of the present invention.

Hereinafter, the above and other objectives, advantages, and features of the present invention and ways of achieving them will become readily apparent with reference to descriptions of the following detailed embodiments in conjunction with the accompanying drawings However, the present invention is not limited to embodiments to be described below and may be embodied in various forms. The embodiments to be described below are provided only to assist those skilled in the art in fully understanding the objectives, configurations, and the effects of the invention, and the scope of the present invention is defined only by the appended claims.

Meanwhile, terms used herein are used to aid in the explanation and understanding of the embodiments and are not intended to limit the scope and spirit of the present invention. It should be understood that the singular forms "a" and "an" also include the plural forms unless the context clearly dictates otherwise. The terms "comprises," "comprising," "includes," and/or "including," when used herein, specify the presence of stated features, integers, steps, operations, elements, components and/or groups thereof and do not preclude the presence or addition of one or more other features, integers, steps, operations, elements, components, and/or groups thereof.

Before describing the embodiments of the present invention, the background for proposing the present invention will be described first for the sake of understanding for those skilled in the art.

An indoor navigation system according to a related art provides a localization service using a radio frequency (RF) (Wi-Fi or Bluetooth low energy (BLE)) signal fingerprint.

Due to changes at a target site, a discrepancy occurs between a fingerprint database (FPDB) and an actual distribution of RF signals at the site, and the quality of the localization service is degraded.

To cope with the degradation, regular surveys on the site may be used.

With high costs associated with regular surveys of target sites, there has been suggestion of crowd-sourcing of required data, but data crowd-sourcing also incurs relevant costs.

For example, energy consumption according to periodic signal scanning, data quota usage for data transmission, etc. are considered relevant costs.

As the costs and privacy considerations become increasingly important, a need for further optimization of data collection methods used for indoor navigation systems arises.

In order to solve the limitations, the present invention proposes a technique for reducing collection of crowd-sourced Wi-Fi/BLE signal data required for FPDB maintenance through active control of a data collection mode.

A method of updating a Wi-Fi/BLE FPDB using crowd-sourcing data in response to occurrence of a significant change at a target site includes the following operations.
1) A user of an indoor localization system collects Wi-Fi/BLE signal information while using a service normally and transmits the collected Wi-Fi/BLE signal information to a localization system server.
2) A server performs checking to detect a difference in states between the collected data and the corresponding FPDB.
3) In response to a significant change being detected, the stored FPDB using the collected data is updated, and in response to no significant change being detected, the collected data is deleted.

According to an embodiment of the present invention, there is proposed a method having the following characteristics to reduce collection of crowd-sourcing data.
1. Separated data collection modes
  a) a site survey data collection mode for initial generation and update of an FPDB after a large-scale change at a target site
  b) a crowd-sourcing data collection mode for monitoring
  c) a crowd-sourcing data collection mode for updating
2. An active control on selecting a data collection mode based on a criterion calculated from the current FPDB state and crowd-sourcing data FIG. 1 illustrates a system for active data collection mode control for reducing crowd-sourcing signal data collection required for FPDB maintenance according to an embodiment of the present invention.

The system for active data collection mode control for reducing crowd-sourcing signal data collection required for FPDB maintenance according to the present invention includes a mobile device 100 configured to support a survey mode, a localization mode, and a crowd-sourcing mode and a server 200 configured to receive data from the mobile device 100, generate and update a FPDB, and control a data collection mode.

The mobile device 100 collects data required for generating an FPDB of an indoor localization system in a survey mode, the data including a vector of a received signal strength indication (RSSI) value collected from an access point at a reference point.

The server 200 generates an FPDB for a target site and distributes the generated FPDB to the mobile device 100 so that the FPDB is provided to an application running in a localization mode.

In parallel with a localization mode, the mobile device 100 executes a crowd-sourcing mode which is an operation mode for update or monitoring.

The server 200 monitors a performance change of the indoor localization system to trigger a data collection mode required in the mobile device 100.

The server 200 evaluates a change measurement value using the FPDB and crowd-sourcing data and clusters a cell, in which the change measurement value is higher than a predefined threshold value, into an area that requires crowd-sourcing data for update.

The server 200 requests an additional survey of the target site when cells, in which the change measured value is higher than the predefined threshold value, occur in a predetermined proportion or more of the target site.

The server 200 performs probabilistic localization using a specific cell and an RSSI value of crowd-sourcing data (RSSI values of newly collected crowd-sourcing data), and calculates the change measurement value based on the entropy of a location posterior distribution.

The indoor localization system according to the embodiment of the present invention includes two main component groups, that is, components in the mobile device 100 and components in the server 200.

Referring to FIG. 1, phones 100a to 100c in the mobile device 100 include one or more applications that support an operation mode, such as a data survey mode, a localization mode, a crowd-sourcing mode for update, and a crowd-sourcing mode for monitoring.

The server 200 includes data inputters 210a to 210c that receive data from the phones 100a to 100c, an FPDB generation/update module 220, an FPDB 230, and a data collection mode control module 240.

In the initial stage, a number of mobile devices operating in a survey mode are used at a target site to collect data required to generate an FPDB of the indoor localization system.

The data is collected from a set in the form of $S=\{s_{\_n,k}\}$, where $s_{\_n,k}$ denotes an RSSI value collected at a reference point $l_n$ from an access point $AP_k$.

The collected data is transmitted to the side of the server 200, and the FPDB generation/update module 220 generates the FPDB 230 for the target site.

The FPDB 230 includes a record for a location and an RSSI value in the form of $M=\{(c_n, s_{n,k})_j\}$.

Herein, $c_n$ denotes a cell around the reference point $l_n$, and $s_{n,k}$ denotes a vector including RSSI values collected at the reference point $l_n$.

After deployment of the indoor localization system, the generated FPDB is distributed to the mobile device 100 and used in an application executed in a localization mode for providing a localization service.

In the operation, in parallel with the localization mode, the application on the mobile device 100 executes a crowd-sourcing mode for monitoring or updating.

In both modes of operation, the mobile device 100 collects signal scan data and location data in the form of $S=\{s_{n,k}\}$.

The difference between the two modes of operation is that the crowd-sourcing mode for monitoring collects signal scan data at a relatively lower rate and transmits the collected data at sparse intervals to minimize energy consumption and reduce privacy concerns.

With an appropriate user authority, the data collection mode control module 240 in the server 200 performs control of a data collection mode as follows.

In general, an application being executed in a localization mode and an FPDB may be considered a perceptor for a location.

By controlling the operation of the perceptor, a desired level of performance may be provided.

One important factor influencing the level of performance (e.g., the quality of the localization service provided) is the quality of the FPDB.

Since the environment of the target site is not static over time, the FPDB deviating from the actual distribution of the RF signals may cause degradation of the quality of the localization service.

Therefore, according to an embodiment of the present invention, the FPDB is updated using crowd-sourcing data, and collection of unrequired data is canceled according to energy and privacy issues.

The data collection mode control module 240 is provided to monitor the performance change of the indoor localization system and accordingly trigger a data collection mode required in the mobile device 100.

During normal operation, the data collection mode control module 240 evaluates a change measurement value $CM_n$ using an FPDB and crowd-sourcing data (data collected in a monitoring or update mode). Index n follows N cells defined around a reference point.

The data collection mode control module 240 uses the change measurement value and a set of predefined thresholds $CT_n$ (n=1, ... and N) to cluster a cell $c_n$, in which the change measure $CM_n$ is higher than a predefined threshold $CT_n$, into an area that requires crowd-sourcing for update.

Figure 2:
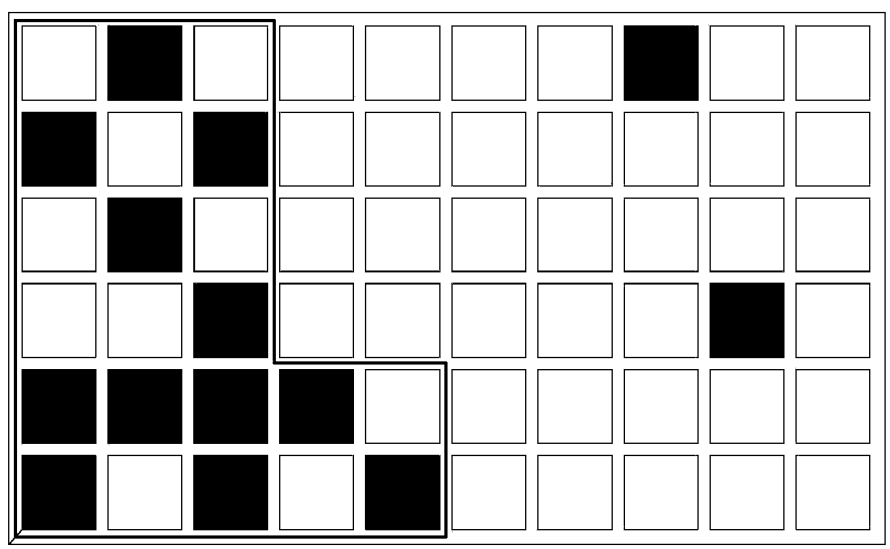
FIG. 2 illustrates a zone map according to an embodiment of the present invention.

Referring to FIG. 2, in the illustrated zone map, dark shaded cells indicate cells with relatively high change measurement values, and an area requiring crowd-sourcing data for update is indicated by a grey line.

A policy generated in the zone map is periodically distributed to the mobile device 100 operating in the target site.

According to the policy, the mobile device 100 allows crowd-sourcing for update to be activated in an area marked as an area that requires update data, and allows crowd-sourcing for monitoring to be activated in other areas.

When a considerable portion of the target site has a change measurement value that is higher than or equal to the predefined threshold, the data collection mode control module 240 notifies the need for an additional survey of the target site.

The change measurement value $CM_n$ needs to be based on a localization error of an onsite test in a set of predefined ground truth points.

Similar to a periodic survey, a test performed periodically consumes a high cost, so the change measurement value $CM_n$ is calculated based on the entropy of a posterior distribution of an estimated location as follows.

Probabilistic localization is performed using a specific cell $c_n$ and an RSSI value of crowd-sourcing data $S=\{s_{n,k}\}$ to obtain a location posterior distribution $p(l|s_j)$ as shown in Equation 1 below.

Herein, s denotes a single scan, and l denotes a location.

Since uniform prior p(l) is used, and it is not location-dependent, the normalizing constant p(s) is ignored.

$$p(l|s_j) = \frac{p(s_j|l)p(l)}{p(s)} \quad \text{[Equation 1]}$$

The likelihood $p(s_j|l)$ is calculated using the current scan $s_j$ and the FPDB, and after obtaining $p(l|s_j)$, the entropy $H_{n,j}$ is calculated as shown in Equation 2 below.

$$H_{n,j} = -\sum_{l \in L} p(l|s_j) \log p(l|s_j) \quad \text{[Equation 2]}$$

The entropy-based measurement value $HM_n$ is calculated as the average of $H_{n,j}$ for scans j=1, ..., and J from a given cell $c_n$.

The change measurement value $CM_n$ is provided as $CM_n = |HM_n^{base} - Hm_n|$. Here, $HM_n^{base}$ denotes an entropy-based measurement value before update.

Figure 3:
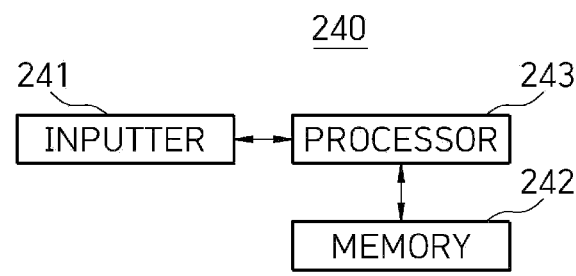
FIG. 3 illustrates a server for performing active data collection mode control for reducing crowd-sourcing signal data collection required for FPDB maintenance according to an embodiment of the present invention.

FIG. 3 illustrates a server for performing active data collection mode control for reducing crowd-sourcing signal data collection required for FPDB maintenance according to an embodiment of the present invention.

The server for performing active data collection mode control for reducing crowd-sourcing signal data collection required for FPDB maintenance according to the present invention includes an inputter 241 configured to collect data from a mobile device, a memory 242 in which a program for generating and updating an FPDB using the data is stored, and a processor 243 configured to execute the program, and the processor 243 monitors a performance change of an indoor localization system to control a data collection mode.

The inputter 241 collects data required for generation of an FPDB from a mobile device in a survey mode.

The processor 243 generates an FPDB for a target site and provides the FPDB to the mobile device so that the FPDB is provided to an application executed in a localization mode.

The processor 243 triggers a data collection mode required in the mobile device according to the monitoring result.

The processor 243 evaluates a change measurement value using the FPDB and crowd-sourcing data and clusters a cell, in which the change measurement value is higher than a predefined threshold, into an area that requires crowd-sourcing data for update.

The processor 243 performs probabilistic localization using an RSSI value of crowd-sourcing data and calculates the change measurement value based on the entropy of a location posterior distribution.

The processor 243 requests an additional survey of the target site when cells, in which the change measurement value is higher than the predefined threshold, occur in a predetermined proportion or more of the target site.

Figure 4:
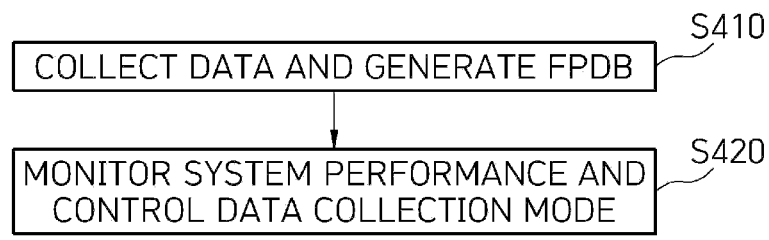
FIG. 4 illustrates a method of active data collection mode control for reducing crowd-sourcing signal data collection required for FPDB maintenance according to an embodiment of the present invention.

FIG. 4 illustrates a method of active data collection mode control for reducing crowd-sourcing signal data collection required for FPDB maintenance according to an embodiment of the present invention.

The method of active data collection mode control for reducing crowd-sourcing signal data collection required for FPDB maintenance according to the present invention includes collecting data from a mobile device to generate an FPDB (S410) and monitoring a performance change of an indoor localization system to control a data collection mode (S420).

In operation S410, data including a vector of RSSI values collected at a reference point from an access point is collected.

In operation S420, a change measurement value is evaluated using an FPDB and crowd-sourcing data, and a cell corresponding to an area that requires crowd-sourcing data is clustered.

In operation S420, probabilistic localization is performed using RSSI values of crowd-sourcing data, and a change measurement value is calculated based on the entropy of a location posterior distribution.

In operation S420, an additional survey of the target site is requested when cells, in which the change measurement value is higher than a predefined threshold value, occur in a predetermined proportion or more of the target site.

Meanwhile, the method of active data collection mode control for reducing crowd-sourcing signal data collection required for FPDB maintenance according to the embodiment of the present invention may be implemented in a computer system or may be recorded on a recording medium. The computer system may include at least one processor, a memory, a user input device, a data communication bus, a user output device, and a storage. The above-described components perform data communication through the data communication bus.

The computer system may further include a network interface coupled to a network. The processor may be a central processing unit (CPU) or a semiconductor device for processing instructions stored in the memory and/or storage.

The memory and the storage may include various forms of volatile or nonvolatile media. For example, the memory may include a read only memory (ROM) or a random-access memory (RAM).

Accordingly, the method for active data collection mode control for reducing crowd-sourcing signal data collection required for FPDB maintenance according to an embodiment of the present invention may be implemented in a computer-executable form. When the method of active data collection mode control for reducing crowd-sourcing signal data collection required for FPDB maintenance according to the embodiment of the present invention is performed by the computer, instructions readable by the computer may perform the control method according to the present invention.

Meanwhile, the method of active data collection mode control for reducing crowd-sourcing signal data collection required for FPDB maintenance according to the present invention may be embodied as computer readable code on a computer-readable recording medium. The computer-readable recording medium is any recording medium that can store data that can be read by a computer system. Examples of the computer-readable recording medium include a ROM, a RAM, a magnetic tape, a magnetic disk, a flash memory, an optical data storage, and the like. In addition, the computer-readable recording medium may be distributed over network-connected computer systems so that computer readable code may be stored and executed in a distributed manner.

As is apparent from the above, the amount of collection of crowd-sourcing data used to keep the latest Wi-Fi/BLE fingerprint database (FPDB) in an indoor localization system can be reduced.

The effects of the present invention are not limited to those described above, and other effects not mentioned above will be clearly understood by those skilled in the art from the above detailed description.

Although the present invention has been described with reference to the embodiments, a person of ordinary skill in the art should appreciate that various modifications, equivalents, and other embodiments are possible without departing from the scope and sprit of the present invention. Therefore, the embodiments disclosed above should be construed as being illustrative rather than limiting the present invention. The scope of the present invention is not defined by the above embodiments but by the appended claims of the present invention, and the present invention is to cover all modifications, equivalents, and alternatives falling within the spirit and scope of the present invention.

The components described in the example embodiments may be implemented by hardware components including, for example, at least one digital signal processor (DSP), a processor, a controller, an application-specific integrated circuit (ASIC), a programmable logic element, such as an FPGA, other electronic devices, or combinations thereof. At least some of the functions or the processes described in the example embodiments may be implemented by software, and the software may be recorded on a recording medium. The components, the functions, and the processes described in the example embodiments may be implemented by a combination of hardware and software.

The method according to example embodiments may be embodied as a program that is executable by a computer, and may be implemented as various recording media such as a magnetic storage medium, an optical reading medium, and a digital storage medium.

Various techniques described herein may be implemented as digital electronic circuitry, or as computer hardware, firmware, software, or combinations thereof. The techniques may be implemented as a computer program product, i.e., a computer program tangibly embodied in an information carrier, e.g., in a machine-readable storage device (for example, a computer-readable medium) or in a propagated signal for processing by, or to control an operation of a data processing apparatus, e.g., a programmable processor, a computer, or multiple computers. A computer program(s) may be written in any form of a programming language, including compiled or interpreted languages and may be deployed in any form including a stand-alone program or a module, a component, a subroutine, or other units suitable for use in a computing environment. A computer program may be deployed to be executed on one computer or on multiple computers at one site or distributed across multiple sites and interconnected by a communication network.

Processors suitable for execution of a computer program include, by way of example, both general and special purpose microprocessors, and any one or more processors of any kind of digital computer. Generally, a processor will receive instructions and data from a read-only memory or a random access memory or both. Elements of a computer may include at least one processor to execute instructions and one or more memory devices to store instructions and data. Generally, a computer will also include or be coupled to receive data from, transfer data to, or perform both on one or more mass storage devices to store data, e.g., magnetic, magneto-optical disks, or optical disks. Examples of information carriers suitable for embodying computer program instructions and data include semiconductor memory devices, for example, magnetic media such as a hard disk, a floppy disk, and a magnetic tape, optical media such as a compact disk read only memory (CD-ROM), a digital video disk (DVD), etc. and magneto-optical media such as a floptical disk, and a read only memory (ROM), a random access memory (RAM), a flash memory, an erasable programmable ROM (EPROM), and an electrically erasable programmable ROM (EEPROM) and any other known computer readable medium. A processor and a memory may be supplemented by, or integrated into, a special purpose logic circuit.

The processor may run an operating system (OS) and one or more software applications that run on the OS. The processor device also may access, store, manipulate, process, and create data in response to execution of the software. For purpose of simplicity, the description of a processor device is used as singular; however, one skilled in the art will be appreciated that a processor device may include multiple processing elements and/or multiple types of processing elements. For example, a processor device may include multiple processors or a processor and a controller. In addition, different processing configurations are possible, such as parallel processors.

Also, non-transitory computer-readable media may be any available media that may be accessed by a computer, and may include both computer storage media and transmission media.

The present specification includes details of a number of specific implements, but it should be understood that the details do not limit any invention or what is claimable in the specification but rather describe features of the specific example embodiment. Features described in the specification in the context of individual example embodiments may be implemented as a combination in a single example embodiment. In contrast, various features described in the specification in the context of a single example embodiment may be implemented in multiple example embodiments individually or in an appropriate sub-combination. Furthermore, the features may operate in a specific combination and may be initially described as claimed in the combination, but one or more features may be excluded from the claimed combination in some cases, and the claimed combination may be changed into a sub-combination or a modification of a sub-combination.

Similarly, even though operations are described in a specific order on the drawings, it should not be understood as the operations needing to be performed in the specific order or in sequence to obtain desired results or as all the operations needing to be performed. In a specific case, multitasking and parallel processing may be advantageous. In addition, it should not be understood as requiring a separation of various apparatus components in the above described example embodiments in all example embodiments, and it should be understood that the above-described program components and apparatuses may be incorporated into a single software product or may be packaged in multiple software products.

It should be understood that the example embodiments disclosed herein are merely illustrative and are not intended to limit the scope of the invention. It will be apparent to one of ordinary skill in the art that various modifications of the example embodiments may be made without departing from the spirit and scope of the claims and their equivalents.

What is claimed is:

1. An active data collection mode control system that reduces crowd-sourcing signal data collection required for fingerprint database (FPDB) maintenance, the system comprising:
a mobile device configured to support a survey mode, a localization mode, and a crowd-sourcing mode; and
a server configured to:
receive data from the mobile device;
generate and update an FPDB from the received data;
control a data collection mode of the mobile device according to a performance change of an indoor localization system;
evaluate a change measurement value using the FPDB and crowd-sourcing data; and
cluster a cell, in which the change measurement value is higher than a predefined threshold, into an area that requires crowd-sourcing data for update.

2. The system of claim 1,
wherein the mobile device collects data required to generate an FPDB of an indoor localization system in the survey mode, and
wherein the data includes a received signal strength indication (RSSI) value collected at a reference point from an access point.

3. The system of claim 1, wherein the server is further configured to:
generate an FPDB for a target site; and
distribute the generated FPDB to the mobile device so that the FPDB is provided to an application that is executed in the localization mode.

4. The system of claim 3, wherein the mobile device is further configured to execute, in parallel with the localization mode, the crowd-sourcing mode which is an operating mode to perform an updating operation or a monitoring operation.

5. The system of claim 1, wherein the server is further configured to monitor the performance change of the indoor localization system to trigger the data collection mode required in the mobile device.

6. The system of claim 1, wherein, in response to the cells, in which the change measurement value is higher than the predefined threshold, occurring in a predetermined proportion or more of a target site, the server is further configured to request an additional survey for the target site.

7. The system of claim 1, wherein the server is further configured to:
perform probabilistic localization using a specific cell and a received signal strength indication (RSSI) value of the crowd-sourcing data; and
calculate the change measurement value based on an entropy of a location posterior distribution.

8. An active data collection mode control method that reduces crowd-sourcing signal data collection required for fingerprint database (FPDB) maintenance, the method comprising:
collecting data from a mobile device to generate and update an FPDB;
monitoring a performance change of an indoor localization system to control a data collection mode of the mobile device,
wherein the monitoring of the performance change comprises:
evaluating a change measurement value using the FPDB and crowd-sourcing data, and
clustering a cell corresponding to an area that requires the crowd-sourcing data.

9. The method of claim 8, wherein the collecting of the data comprises collecting the data including a vector of received signal strength indication (RSSI) values collected at a reference point from an access point.

10. The method of claim 8, wherein the monitoring of the performance change includes:
performing probabilistic localization using received signal strength indication (RSSI) values of the crowd-sourcing data; and
calculating the change measurement value based on an entropy of a location posterior distribution.

11. The method of claim 8, wherein the monitoring of the performance change includes requesting an additional survey of a target site when a proportion having the change measurement value that is higher than a predefined threshold value in the target site is greater than or equal to a preset proportion.

12. A server configured to perform active data collection mode control to reduce crowd-sourcing signal data collection required for fingerprint database (FPDB) maintenance, the server comprising:

an inputter configured to collect data from a mobile device;

a memory in which a program to generate and update an FPDB using the data is stored; and a processor configured to execute the program, to:
monitor a performance change of an indoor localization system based on the collected data;
control a data collection mode in the mobile device according to the performance change of the indoor localization system;
evaluate a change measurement value using the FPDB and crowd-sourcing data; and
cluster a cell, in which the change measurement value is higher than a predefined threshold, into an area that requires crowd-sourcing data for update.

13. The server of claim 12, wherein the inputter is configured to collect data required to generate the FPDB from the mobile device in a survey mode.

14. The server of claim 12, wherein the processor is further configured to:
generate the FPDB for a target site; and
distribute the generated FPDB to the mobile device so that the FPDB is provided to an application that is executed in a localization mode.

15. The server of claim 12, wherein the processor is further configured to trigger a data collection mode required in the mobile device according to a result of the monitoring.

16. The server of claim 12, wherein the processor is further configured to:
perform probabilistic localization using a received signal strength indication (RSSI) value of the crowd-sourcing data; and
calculate the change measurement value based on an entropy of a location posterior distribution.

17. The server of claim 12, wherein, when a proportion having the change measurement value that is higher than a predefined threshold value in a target site is greater than or equal to a preset proportion, the processor is further configured to request an additional survey for the target site.

* * * * *